United States Patent [19]
Boyd

[11] Patent Number: 5,581,321
[45] Date of Patent: Dec. 3, 1996

[54] COVER ASSEMBLY FOR CAMERA

[75] Inventor: James D. Boyd, Rochester, N.Y.

[73] Assignee: Eastman Kodak Company, Rochester, N.Y.

[21] Appl. No.: 327,250

[22] Filed: Oct. 21, 1994

[51] Int. Cl.$^6$ .................................................. G03B 17/02
[52] U.S. Cl. ................................................................ 396/535
[58] Field of Search ............................................. 354/288

[56] References Cited

U.S. PATENT DOCUMENTS

| | | |
|---|---|---|
| 3,389,953 | 6/1968 | Gerry . |
| 5,285,229 | 2/1994 | Kamata . |
| 5,311,231 | 5/1994 | Suzuki et al. . |
| 5,329,330 | 7/1994 | Sakai et al. . |
| 5,349,410 | 9/1994 | Kamata . |

FOREIGN PATENT DOCUMENTS 2257801  1/1993  Japan .

OTHER PUBLICATIONS

Database WPI, Section EI, Week 8110, Derwent Publications Ltd., London, GB; Class S06, AN81-C0281D, Peschel H, 'Camera with two-part housing has recess in rear wall with sliding cover to accomodate batteries', abstract & Research Disclosure, vol. 202, No. 050, 10 Feb. 1981, Emsworth, GB.

Primary Examiner—David M. Gray
Attorney, Agent, or Firm—Peter J. Bilinski

[57] ABSTRACT

A method of assembling a camera by attaching a cover part to another part to make the camera lighttight. According to the present invention, the cover part is attached to the other part at respective corresponding locations between opposite ends of each part to hold fast a film section between the two parts; and opposite ends of the two parts are attached to make the camera lighttight.

8 Claims, 8 Drawing Sheets

COVER ASSEMBLY FOR CAMERA

FIELD OF THE INVENTION

The invention relates generally to the field of photography, and in particular to an improved cover part and a method of assembling a camera by attaching the cover part to another part to make the camera lighttight.

BACKGROUND OF THE INVENTION

In known single-use cameras, a camera body supports a number of photographic components such as a viewfinder, a taking lens, a shutter mechanism and a film advancing and metering mechanism. The body also includes a pair of chambers for holding a film cassette and a take-up spool, respectively, on opposite sides of an exposure gate. To create a lighttight seal, a pair of covers are attached to the front and rear of the camera body.

Typically, a film cassette is loaded into the film cassette chamber of the camera body and the film is prewound from the cassette onto the take-up spool allowing the film to be drawn or wound back into the film cassette during film exposure. Upon exposing all the film, the cassette can then be withdrawn from the camera body by the photofinisher.

In the assembly of many known single-use cameras, the rear cover must be fitted to the remainder of the camera prior to prewinding of the film onto the take-up spool. This fitting is required in order to maintain proper film registration within the camera body to the sprocket wheel which engages the edge perforations of the film. It should be readily apparent that if film registration is not maintained, then the camera will not operate in a functional manner.

The attachment of the rear cover to the remainder of the described camera constitutes a permanent seal. For each attachment, there is a need to provide a lighttight camera at final assembly such as by attachment means such as snaps, hooks, ultrasonic sealing or press fitting members, prior to rewinding of the film due to the need to provide a lighttight camera. In the case of those cameras using press fitting members, considerable downward force is required to fully seat the back cover to the rear of the camera body. Application of this force, if repeated hundreds of times per day by an operator in a manual assembly environment, could lead to repetitive motion trauma types of injuries.

SUMMARY OF THE INVENTION

The present invention is directed to overcoming one or more of the problems set forth above. Briefly summarized, according to one aspect of the present invention, there is provided a method of assembling a camera by attaching a cover part to another part to make the camera lighttight, comprising the steps of:

attaching the cover part and the other part at respective corresponding locations between opposite ends of each part to hold fast a film section between the two parts; and attaching the opposite ends of the two parts to make the camera lighttight.

According to another aspect of the present invention, there is provided an assemblage of camera parts comprising a cover part and another part which can be assembled to make a camera lighttight, characterized by:

first attaching means located at respective corresponding locations between opposite ends of each part for attaching the cover part and the other part to hold fast a film section between the two parts; and second attaching means located at the opposite ends of each the two parts for attaching the cover part and the other part so as to make the camera lighttight.

According to still another aspect of the present invention there is provided a camera comprising a cover part and another part which are assembled to make the camera lighttight, characterized by:

first attaching means located at respective corresponding locations between opposite ends of each part for attaching the cover part and the other part to hold fast a film section between the two parts; and second attaching means located at opposite ends of each of the two parts for attaching the cover part and the other part so as to make the camera lighttight.

An advantageous aspect of the present invention is that the cover part can be assembled to the remainder of the camera to allow proper film registration to be maintained with a minimum of applied force in attaching the cover part to the camera. This considerably reduces the incidence of repetitive motion trauma injuries. Additional operations can then be completed on the camera without having to finally seat the cover to the camera until a later point in the assembly.

These and other aspects, objects, features and advantages of the present invention will be more clearly understood and appreciated from a review of the following Detailed Description of the Preferred Embodiments and appended claims, and by reference to the accompanying Drawings.

DETAILED DESCRIPTION OF THE INVENTION

A preferred embodiment of the present invention is herein described which pertains to a recyclable single-use camera, which is shown in FIGS. 1–8.

For background purposes, in typical single-use cameras, a user exposes a filmstrip contained in the camera and turns the entire film package; that is, the camera and the contained film to the photofinisher who unloads the filmstrip for development. In most cases, the filmstrip has been initially prewound onto a take-up spool contained within a film roll chamber of the camera body so that as exposures are taken, the filmstrip is rewound into the film cartridge, for removal by the photofinisher. When the camera is sent in film processing, the rear cover is torn away from the camera body, fully exposing those parts supported by the body, as well as the body itself, to the environment.

In this particularly described embodiment, however, there is described a single-use camera which can be refurbished and recycled using previously used single-use camera parts.

Figure 1:
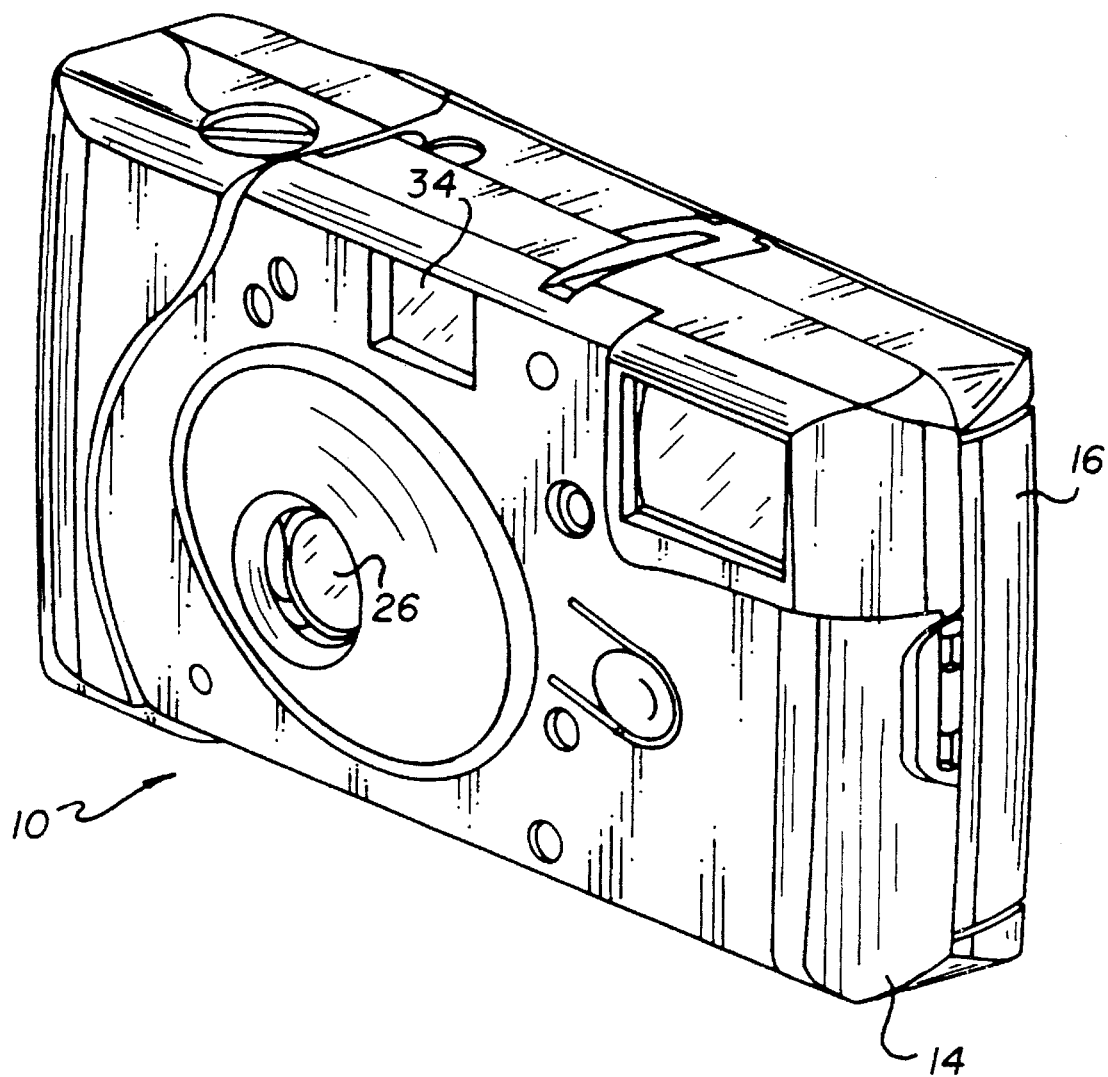
FIG. 1 is a front perspective view of a single-use camera according to a preferred embodiment of the present invention.
Figure 2:
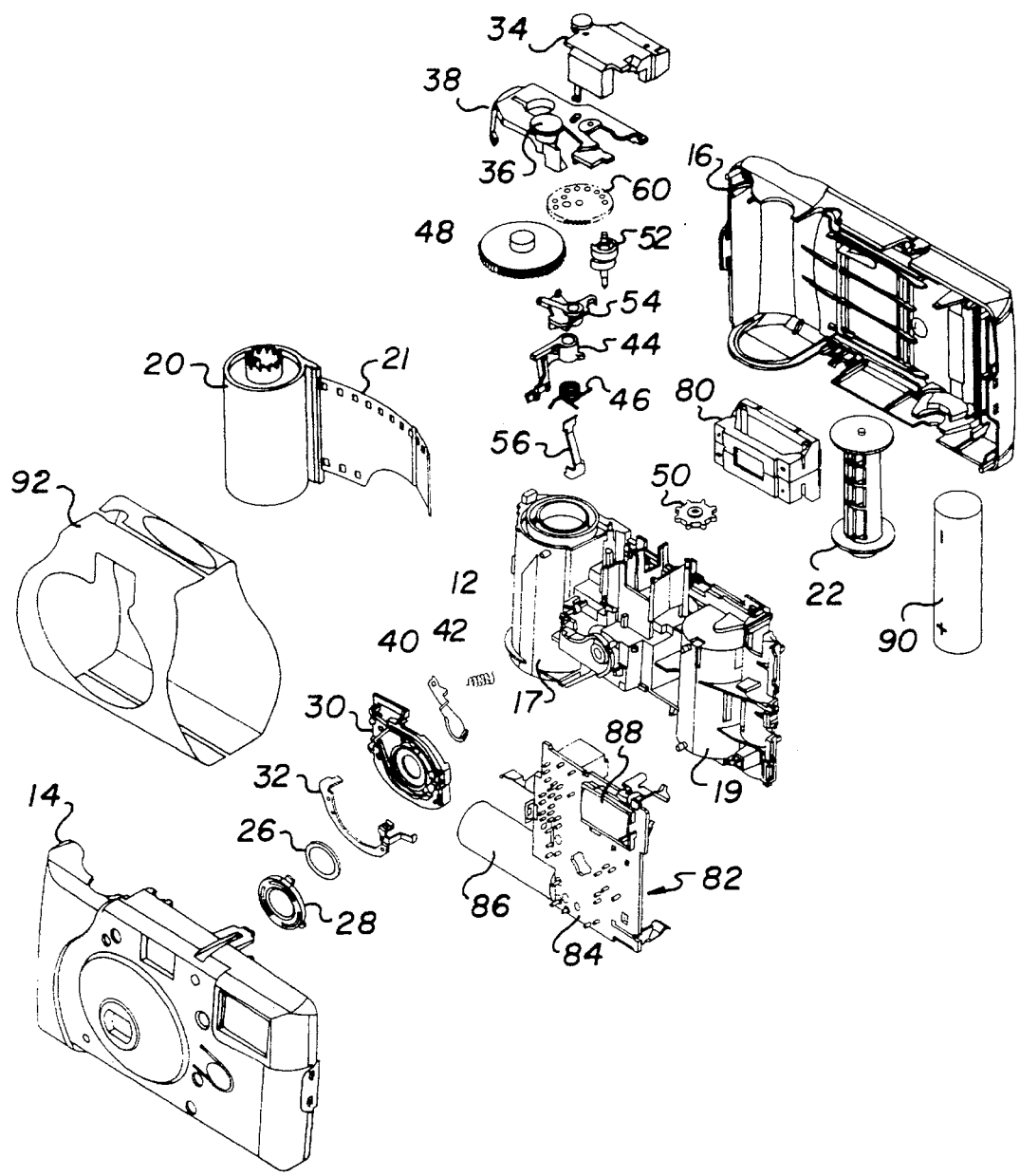
FIG. 2 is an exploded front perspective view of the single-use camera shown in FIG. 1.

Referring first to FIGS. 1 and 2, an assembled single-use camera 10 of the preferred embodiment comprises a main body 12, a front cover 14 which is attached to the front of the main body, and a rear cover 16 that is attached to the rear of the main body. Each of the main body 12, the front cover 14 and the rear cover 16 are formed from molded plastic parts.

Figure 6:
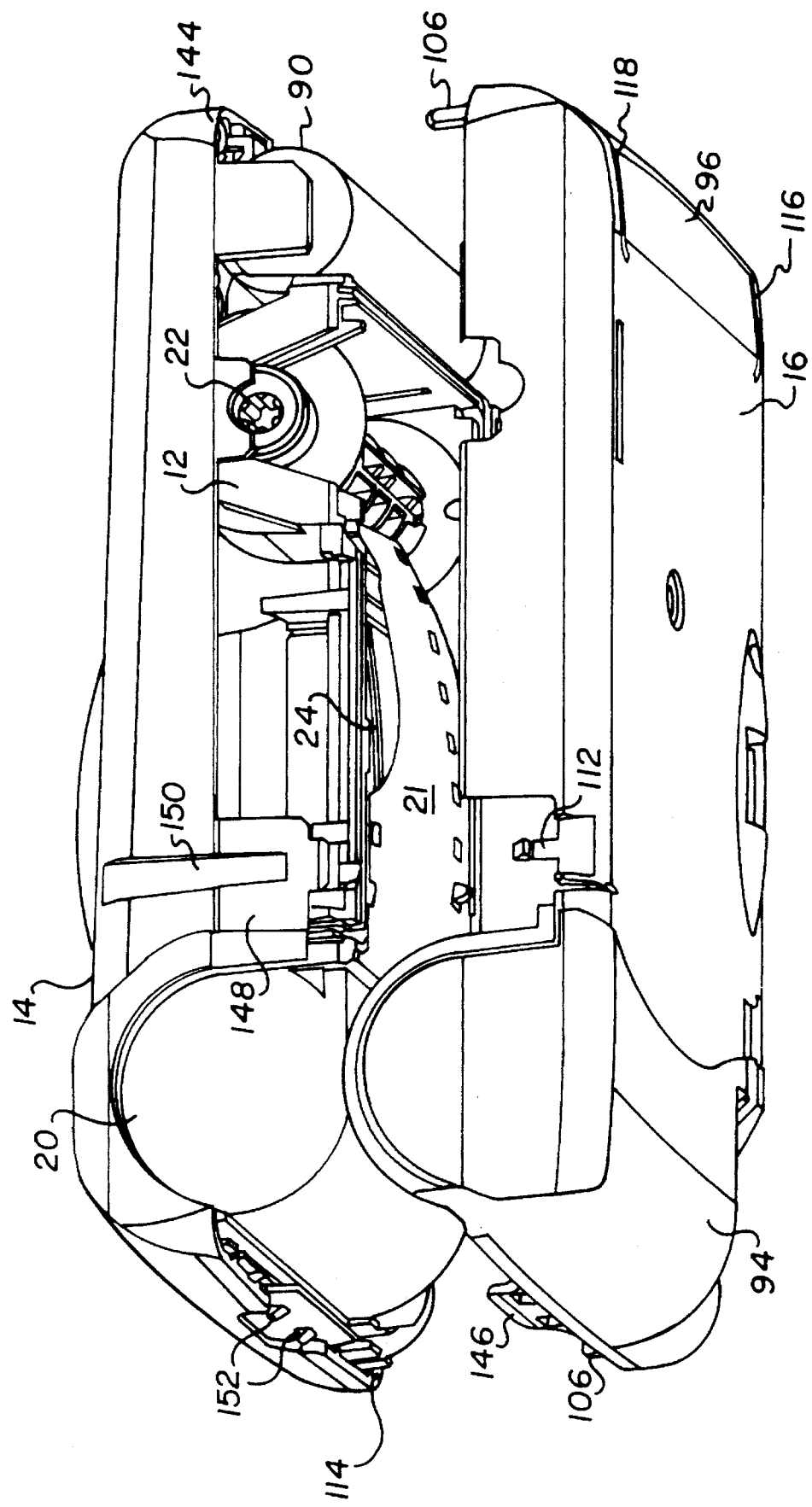
FIG. 6 is a bottom perspective view of the camera of FIGS. 1–5 in a partially assembled condition prior to the assembly of the rear cover.

Referring now more particularly to the exploded camera detail shown in FIG. 2, the main body 12 includes a pair of formed chambers 17, 18 for retaining a film cassette 20 and a take-up spool 22, respectively. The chambers 17, 18 are oppositely disposed relative to an exposure gate 24, which is shown in FIG. 6. The body 12 additionally supports a number of camera parts which are attached thereto prior to the attachment of the covers 14, 16 which sandwich the body. These parts include a taking lens 26 which is attached to the front of the body 12 by means of a retainer 28 and a support plate 30, sandwiching the lens therebetween. A contact switch 32 is also attached to one side of the support plate 30. Other parts attached to the body 12 include a plastic viewfinder 34; a shutter mechanism consisting of a keeper plate 38 having a depressable shutter release portion 36 for tripping a shutter blade 40, which is biased by a spring 42 via a high-energy lever 44 which is also biased by a helical spring 46; a film advancing and metering mechanism consisting of a film winding knob 48 which engages the spool (not shown) of a loaded film cassette 20, a sprocket 50 for engaging edge perforations 23 of the film 21 having a spring biased portion extending into a rotatable cam 52 which engages a metering lever 54 biased by a spring 56, the cam 52 having an extending portion 58 for contacting the teeth of a frame counter 60; a light baffle 80 which is mounted into the rear of the body 12 and the exposure gate 24, FIG. 6; and a flash illumination assembly 82 including a circuit board 84, capacitor 86 and flashhead 88, which is powered by a battery 90. As noted above, the front and rear covers 14, 16 are sandwiched together with the body 12. A label 92 is attached to the finished camera 10. The manner of assembling the covers, particularly the rear cover 16 to the remainder of the camera 10, is described in greater detail below.

Figure 3:
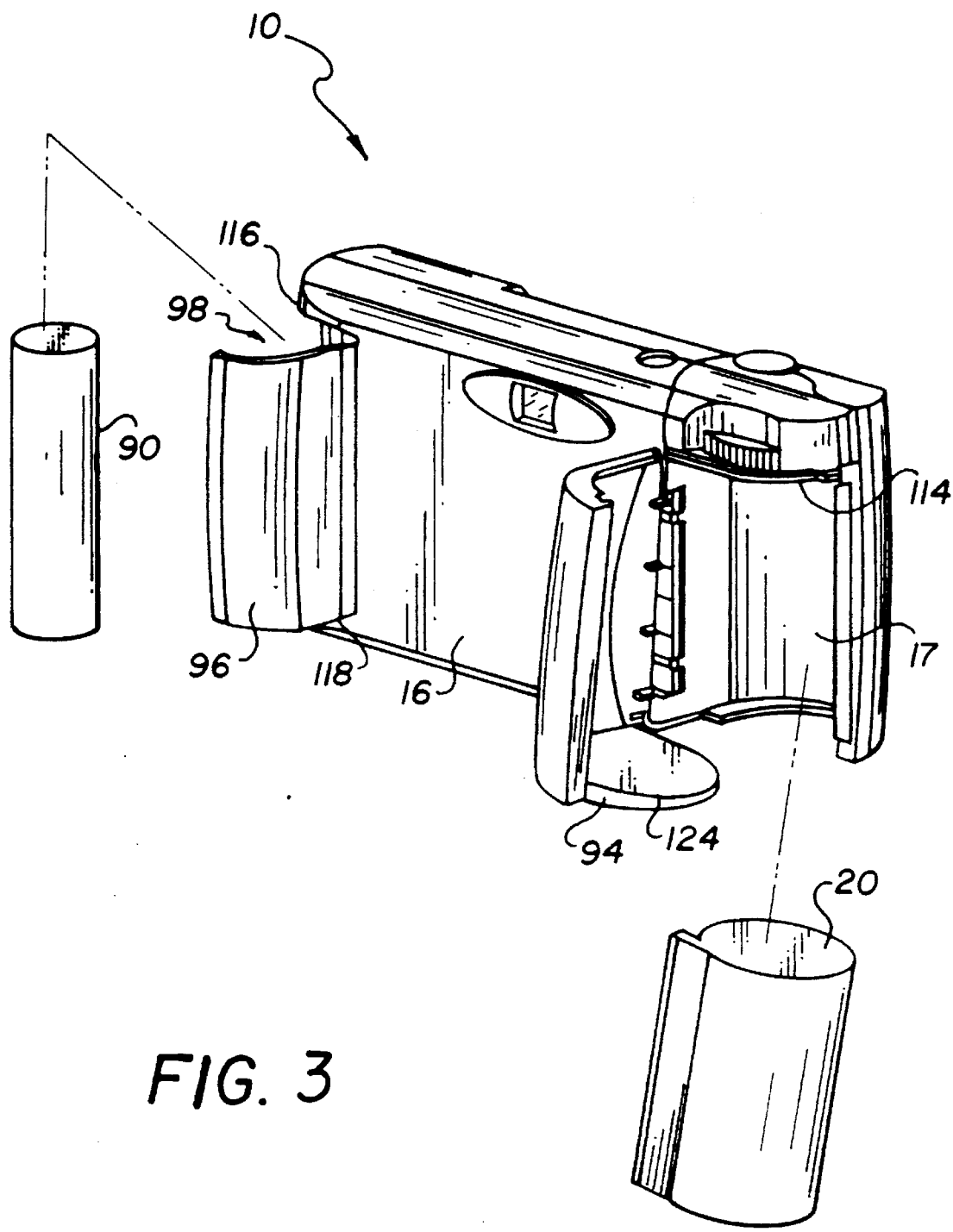
FIG. 3 is a perspective view of the rear of the camera shown in FIGS. 1 and 2 showing the removability of the film cassette and flash battery from the camera without having to completely remove the rear cover.
Figure 4:
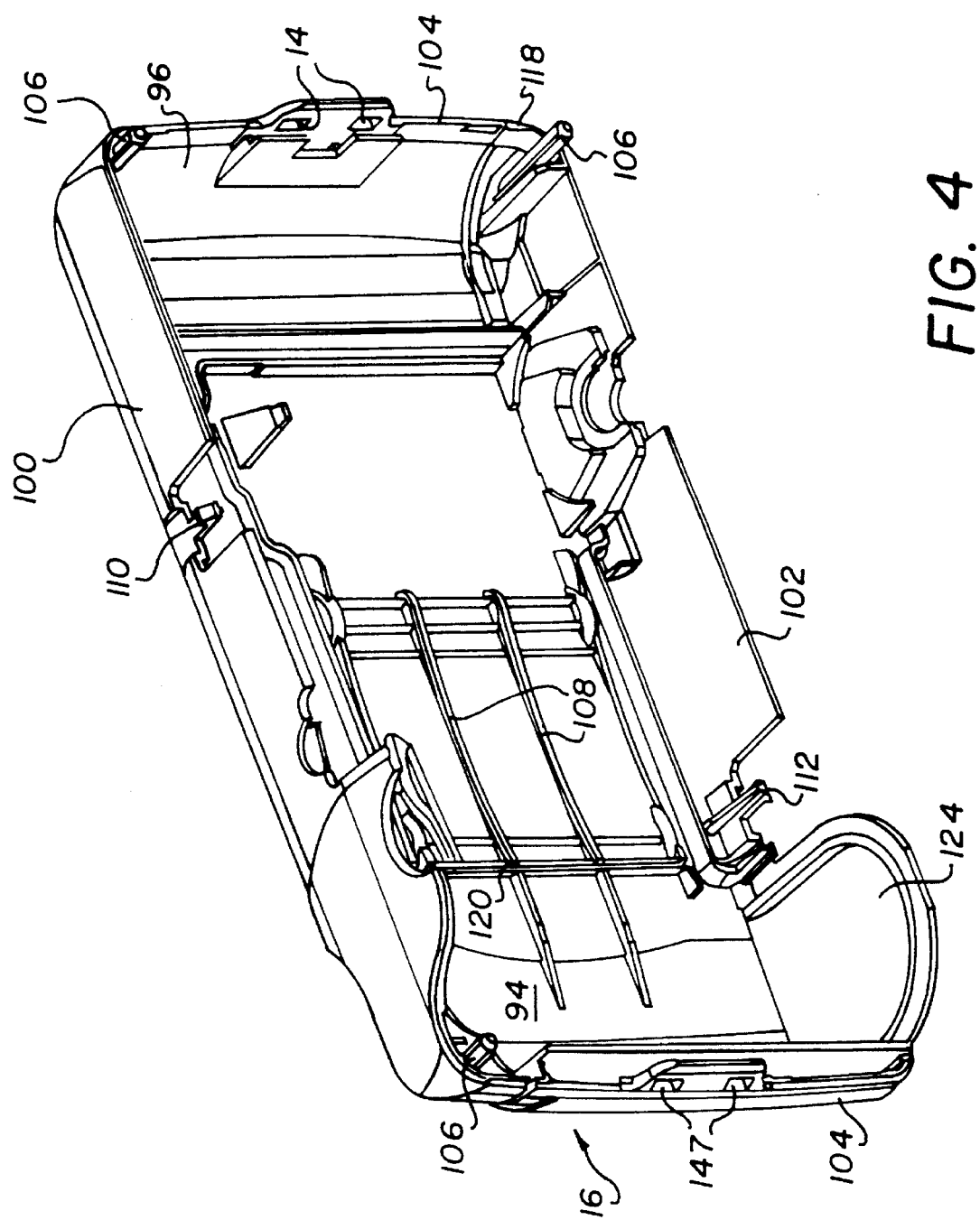
FIG. 4 is a top perspective view of the rear facing side of the front cover of the camera of FIGS. 1–3.

Referring to FIGS. 3 and 4, a breakaway door 94 is provided on the rear cover 16 which allows removal of the film cassette 20 from the film cassette chamber 17. The opening of the door 94 breaks the rear cover 16, that is, by destroying the lighttight integrity of the camera 10, but does not expose those parts which are supported by the camera body 12, or the camera body itself.

The film door 94 is defined by a vertically extending preformed groove 120 which is preferably located opposite the inner periphery of the film cassette chamber 17 after the rear cover 16 is finally assembled to the rear of the camera 10. A horizontal slot 114, FIG. 7, extending from the preformed groove 120 to the outer edge of the rear cover 16 defines the upper boundary of the door 94. A platform portion 124 of the lower edge section 104 of the rear cover 16 defines the lower boundary of the film door 94. In operation, the groove 120 acts as a hinge for the film door 94.

Similarly, a second breakaway door 96 is also provided on the rear cover 14 to be opened by the photofinisher in order to remove the flash battery 90 from a battery compartment 98, if desired. The battery door 96 is defined by a preformed groove 122 extending vertically along the interior of the rear cover 16, as well as a pair of horizontally extending slots 116, 118, FIG. 6, that depend from the groove 122 to the side portions 104 in order to define upper and lower boundaries of the door 96 which are sufficiently spaced from each other to allow access to the battery 90.

Engagement portions 147, 149 are provided at the ends of each door 94, 96 for attachment to hook portions 152, 154 which are provided on the front cover 14. Alternately, the film and battery doors 94, 96 can be sealed to the front cover 14, such as by ultrasonic welding. Each of the doors 94, 96 provide access to the film cassette 20 and the flash battery 90, respectively, without having to remove the rear cover 16 or causing undue exposure to the interior of the camera body 14.

The rear cover 16 more specifically includes a top and bottom edge section 100, 102 and opposing end sections 104 which define a recessed interior sized to contain the rear of the body 12, and also allows attachment to the front cover 14 as described below. A set of press fitting nail-like members 106 depend from three of the corners of the rear cover 16; specifically, the upper corner adjacent the film door 94, and each of the upper and lower corners adjacent the battery door 96. A low-force snap fitting hook member 110, 112 depends from each of the top and bottom edge sections 100, 102, each of the snap fitting hook members 110, 112 being preferably oppositely offset from the center of the cover 16 and between the end sections 104. Also included on the front facing side of the rear cover 16 is a set of film guide members 108.

Figure 5:
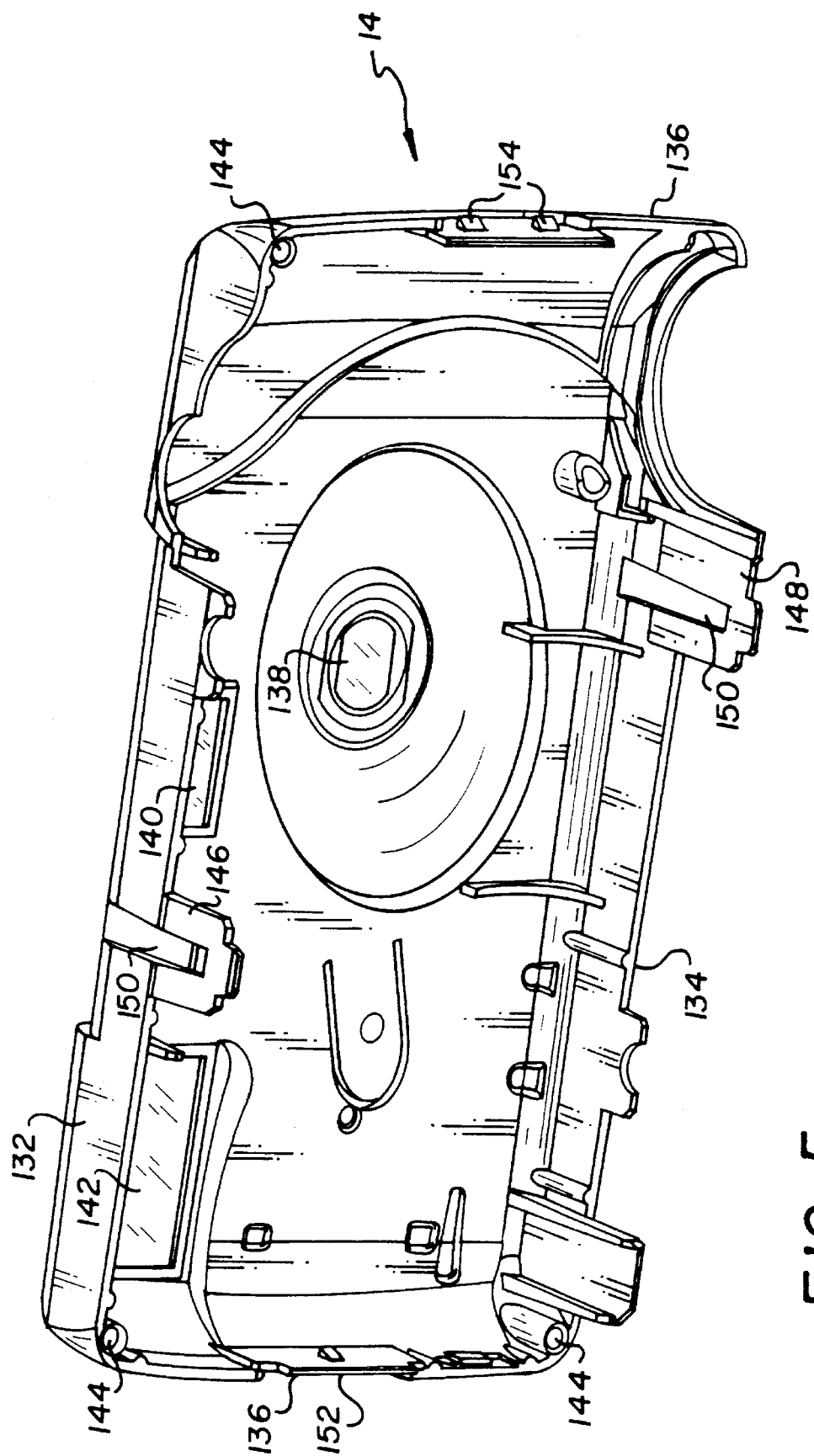
FIG. 5 is a top perspective view of the front facing side of the rear cover of the camera of FIGS. 1–3.

Turning to FIG. 5, the front cover 14 similarly includes an upper and lower edge section 132, 134 as well as opposing end sections 136, which collectively define a recessed interior for accommodating the front of the main body 12 and which allows for attachment to the rear cover 16. Apertures 138, 140, 142 are provided to allow exterior access by the taking lens 26, the viewfinder 34, and the flashhead 82, respectively. An additional set of holes 144 separately provided at three corners of the cover 14 are sized for receiving each of the press fitting nail members 106.

A pair of engagement portions 146, 148 depend inwardly from the rear side of the front cover 14, each of the portions having an elongated cut-away portion defining a slot 150. The engagement portions 146, 148 are located on the upper and lower edge sections 130, 132 of the front cover 14, respectively so as to correspond to the respective locations of the snap fitting hook members 110, 112 when the covers 14, 16 are assembled to one another, sandwiching the body 12 in a lighttight manner.

Each of the rear and front covers 14, 16 are preferably made from a recyclable plastic material, such as polystyrene, and are defined by a thin cross-section allowing each of the covers to be flexible.

ASSEMBLY OF THE CAMERA

Figure 7:
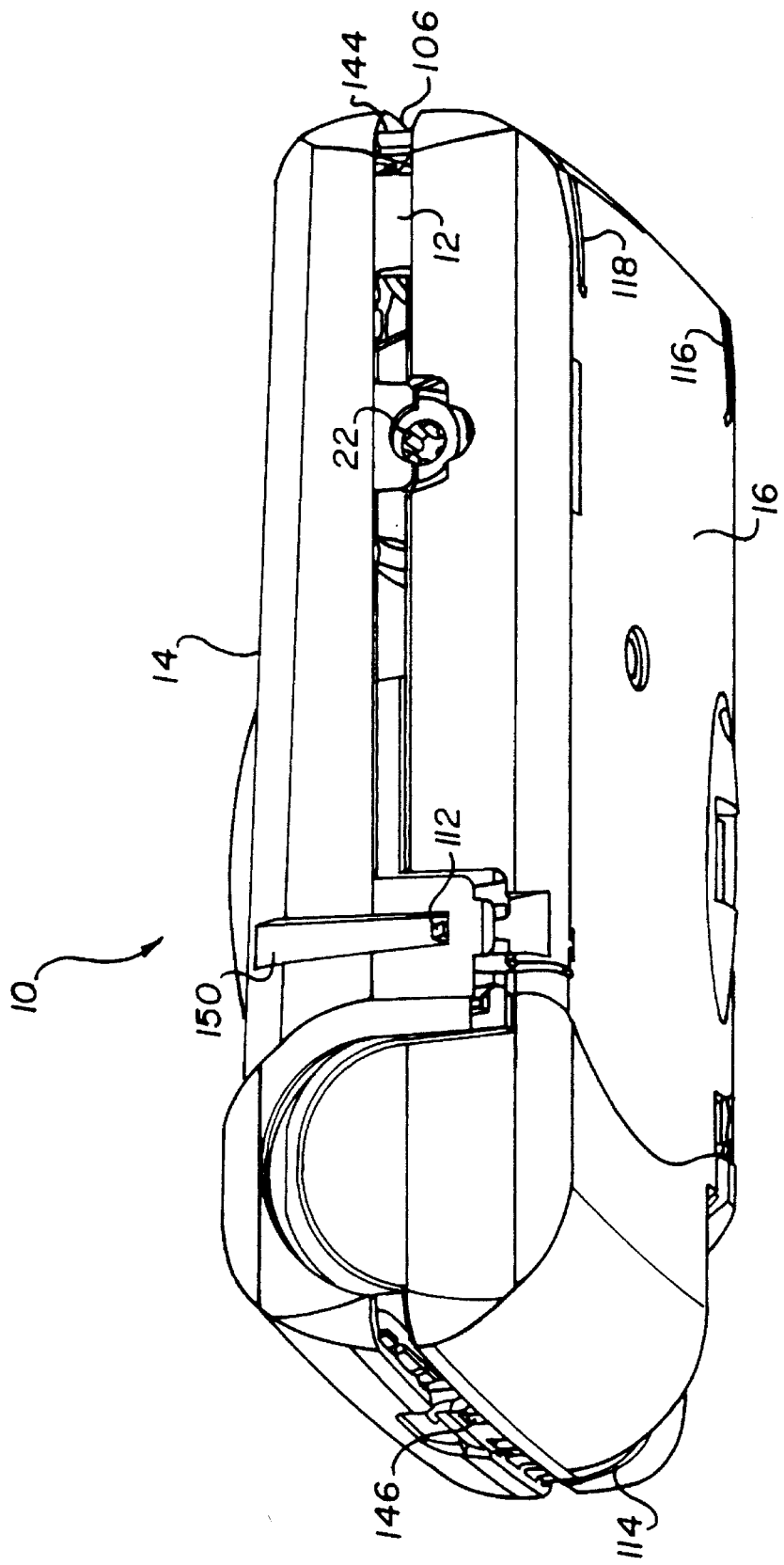
FIG. 7 is the bottom perspective view of FIG. 6, showing the assembly of the rear cover at an intermediate assembly position.
Figure 8:
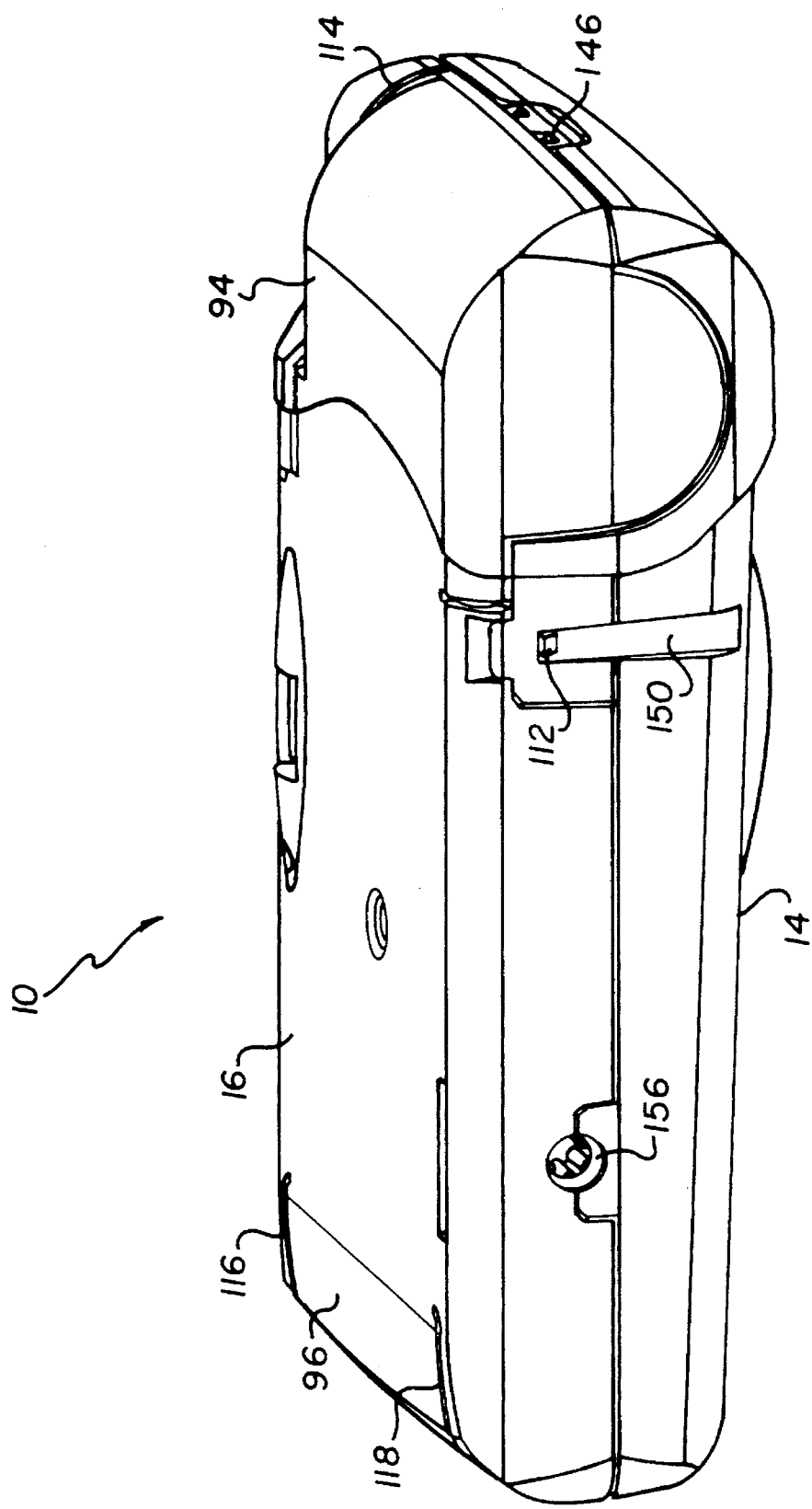
FIG. 8 is the bottom perspective view of the camera of FIGS. 6 and 7 showing the rear cover when finally assembled to the camera.

Referring now to FIGS. 6–8, the assembly of the covers 14, 16 to the camera body 12 will be described in greater detail. The description which follows begins with the initial assembly of a recyclable single-use camera 10. Initially, after each of the supported single-use camera parts have been attached to the camera body 12 in a known manner, FIG. 2, the front cover 14 is fitted to the front face of the body 12. The interior of the front cover 14 is preferably sized to provide a snug fit with the front of the body 12. Additionally, hooks (not shown) may be provided for structural connection between the front cover and the front of the body 12. The rear of the camera 10, including the film cassette chamber 17 and exposure gate 24, are exposed.

A film cassette 20 is placed within the film cassette chamber 17 and the leading portion of the film 21 contained within the cassette 20 is engaged with the take-up spool 22 that is housed and supported within the film roll chamber 18, as is conventionally known. Edge perforations 23 of the filmstrip 21 are then engaged with the sprocket wheel 50 that is disposed between the two chambers 17, 18.

To insure and maintain proper registration of the film 21 to the sprocket 50 and the take-up spool 22, the rear cover 16 must be assembled to the rear of the camera 10 with sufficient pressure being exerted by the rear cover 16 to prevent the film 21 from clock springing away from the sprocket wheel 50, due in part to the natural curvature or set of the wound film 21. To provide this maintenance of film position, the rear cover 16 should preferably be assembled to the camera 10 at approximately its final assembly position in the adjacent area of the sprocket 50.

The snap fitting hook members 110, 112 allow placement of the rear cover 16 to an intermediate assembly position, as shown in FIG. 7. This placement is accomplished by positioning the rear cover 16 relative to the rear of the camera 10, so that the snap fitting hook members 110, 112 are aligned with the engagement portions 146, 148 of the front cover 14 and by pushing the rear cover 16 into the front cover 14 until the hooks are positively engaged with the elongated slots 150.

Placement of the rear cover 16 to an intermediate assembly position requires considerably less force than press fitting of the cover 16 to the camera 10, thereby reducing the incidence of repetitive motion trauma to the human operator. Engagement of the rear cover 16 to the intermediate assembly position causes the center of the cover 16 to bow inwardly relative to the remainder of the cover; that is, press fitting members 106, which are not yet engaged with the camera 10. This positioning of the cover 16, however, allows the film 21 to remain properly positioned relative to the sprocket 50.

Assembly of the rear cover 16 into the intermediate assembly position, FIG. 7, allows the film 21 to remain registered with the sprocket 50 and the take-up spool 22 and allows additional assembly and handling operations to be performed without disengagement of the film, such as movement of the camera to a station dedicated to precharging of the flash circuit, or other similar operations.

After the rear cover 16 has been located in the intermediate assembly position, FIG. 7, and the interim assembly and handling operations have been performed, the camera 10 is placed on a conveyor (not shown) or otherwise transported to a prewind turntable (not shown) where the camera 10 is engaged, such as by a pneumatic press (not shown) which fully seats the rear cover 16 in place to the camera body 12 by application of force to flex the opposing end sections 104 of the rear cover 16 inwardly in order to seat the press fit nails 106 into the corresponding holes 144 found on the front cover 14, FIG. 8. A force of about 44–88 newtons (10–20 pounds) is sufficient for providing proper final seating of the rear cover 16. Alternately, in lieu of the pneumatic press, the cover 16 can be finally seated by manually squeezing or flexing the end sections of the cover 16 into the final assembly position. The flexibility of the plastic cover material allows the snap fitting hook members 110, 112 to remain engaged with portions 146, 148, to maintain film registration during the press fitting of the nails 106.

Upon final seating of the cover 16 to the camera 10, causing the camera to be lighttight, the film 21 can then be prewound onto the take-up spool 22 on a turntable or other assembly fixture (not shown), by winding of the spool 22 through an external access hole 156 and subsequently covering the hole with the label 92, FIG. 2, completing the assembly of the camera 10. The rear cover 16 is designed to be tightly press-fit to a final engaged position with the remainder of the camera 10, FIG. 8, so as to provide a permanent fit, as well as a light-tight seal.

The preceding discussion described an initial assembly operation of the recyclable single use camera 10. Following the exposure of the contained film 21, the camera 10 is returned to the photofinisher who opens the film door 94 in order to remove the film cartridge 20 from the film cartridge chamber 17 by disengaging the hook portions 152 of the front cover 14 from the engagement portion 147 of the rear cover 16, such as with a screwdriver or other suitable tool, and by bending the door 94 along the preformed groove 120 which serves as a structurally weakened area relative to the remainder of the cover 16. Similarly, the flash battery 90 is removed from the battery compartment 98 by opening the battery door by disengaging the hook portions 154 from the engagement portion 149 and by bending the door 96 at the groove 122. After disengagement of the hook members 154 from their respective engagement holes 128 it can be seen that the grooves 120, 122 serve as the only remaining structurally supporting portions for each of the film door 94 and the battery door 96, due to the presence of the slots 114, 116, 118.

After the film cassette 20 and the flash battery 90 have been unloaded by the photofinisher the camera 10 of this particular embodiment is ready for recycling. The rear cover 16 and the front cover 16 are each broken away from each other and from the camera body 12, such as by unsnapping the hook members 152, 154 on each of the film door 94 and the battery door 96 respectively, and by pulling the rear cover 16 from the film door side, shearing the nail 106 from the hole 144. Alternately, the press fitting nail members 106 can be sheared (not shown), to allow the rear cover 16 to be removed from the camera body 12 without destroying the reusability of the body 12.

After removal from the remainder of the camera 10, the covers, 14, 16, can be sent to be pulverized, each being made from a recyclable plastic such as polystyrene. In the meantime, an evaluation can be made as to each of the parts supported by the camera body 12; ie: the viewfinder 24, shutter mechanism 36, flash illumination assembly 82, etc. Those parts deemed worn can be removed from the body 12 and replaced. The remaining single-use parts, such as the frame counter 60, can remain supported by the body 12, for reassembly of the camera 10.

The invention has been described with reference to a preferred embodiment. However, it will be appreciated that variations and modifications can be effected by a person of ordinary skill in the art without departing from the scope of the invention. For example, it should be readily apparent at the outset that the present invention assembly can be applied other than with the recyclable single-use camera herein described.

PARTS LIST 10 camera
12 main body
14 front cover
16 rear cover
17 film cassette chamber
18 film roll chamber
20 film cassette
21 filmstrip
22 take-up spool
23 edge perforations
24 exposure gate
26 taking lens
28 retainer
30 support plate
32 contact switch
34 viewfinder
36 shutter release portion
38 keeper plate
40 shutter blade
42 spring
44 high-energy lever
46 helical spring
48 film winding knob
50 sprocket
52 cam
54 metering lever
56 spring
58 extending portion
60 frame counter
80 light baffle
82 flash illumination assembly
84 circuit board
86 capacitor
88 flash head
90 flash battery
92 label
94 first break-away door
96 second break-away door
98 battery compartment
100 top edge section
102 bottom edge section
104 end sections
106 press-fit nail members
108 film guide members
110 low force snap fitting hook member
112 low force snap fitting hook member
114 slot
116 slot
118 slot
120 groove
122 groove
124 platform
126 engagement portion
128 hole
132 top edge section
134 bottom edge section
136 end sections
138 aperture
140 aperture
142 aperture
144 holes
146 engagement portion
147 engagement portion
148 engagement portion
149 engagement portion
150 slot
152 hook portion
154 hook portion
156 external access hole

I claim:

1. A method of assembling a camera by attaching a flexible cover part to another part to make the camera lighttight, comprising the steps of:

attaching the cover part and the other part at respective corresponding locations between opposite ends sides of each part to hold fast a film section situated between the two parts and to assemble said cover part in an intermediate assembly position; and fixedly attaching the opposite ends of the two parts to assemble the cover part in a final assembly location relative to said other part and to make the camera lighttight wherein the cover part and the other part are attached by bowing the flexible cover part inwardly so as to hold fast said film section held between the two parts and in which the opposite ends of the two parts are attached by flexing the opposite ends inwardly after said bowing step so as to make the camera lighttight.

2. A method as recited in claim 1, wherein said camera includes a body which is sandwiched between said cover part and said other part when said cover part and said other part are attached to each other.

3. An assemblage of camera parts comprising a flexible cover part and another part which can be assembled to make a camera lighttight, is characterized by:

first attaching means located at respective corresponding locations between opposite ends of each part for attaching the cover part to the other part in an intermediate assembly position to hold fast a film section between the two parts; and second attaching means located at the opposite ends of each of the two parts for attaching the flexible cover part to the other part in a final assembly position so as to make the camera lighttight wherein said first attaching means includes hook members, the attachment of which causes a portion of the flexible cover part between the opposing ends to bend inwardly relative to the remainder of the cover part and said second attaching means includes engagement members, the attachment of which causes the opposing end portions to flex inwardly to place the cover part in the final assembly position.

4. An assemblage as recited in claim 3, wherein said first attaching means includes a pair of snap fitting hook members for attaching said cover part and said other part at said respective corresponding locations, and said second attaching means includes at least a pair of press-fitting nail members located on opposite ends for attaching said parts to make the camera lighttight in the final assembly position.

5. A camera comprising a flexible cover part and another part which are assembled to make the camera lighttight, is characterized by:

first attaching means located at respective corresponding locations between opposite ends of each part for attaching the cover part and the other part in an intermediate assembly position to hold fast a film section between the two parts; and second attaching means located at the opposite ends of each of the two parts for attaching the cover part and the other part in a final assembly position so as to make the camera lighttight wherein said first attaching means includes hook members, the attachment of which causes a portion of the flexible cover part between the opposing ends to bend inwardly relative to the remainder of the cover part and said second attaching means includes engagement members, the attachment of which causes the opposing end portions to flex inwardly to place the cover part in the final assembly position.

6. A method of assembling a camera by attaching a flexible cover part to a main body part to make the camera lighttight, comprising:

a) attaching the cover part to the main body part at respective corresponding locations between opposite ends of each part;

b) bowing the flexible cover part inwardly to hold fast a film section between the two parts; and c) straightening the flexible cover part to release the film section.

7. A method according to claim 6, further comprising the step of securing the cover part to the main body part simultaneously with the straightening step to make the camera lighttight.

8. A method of assembling a camera by attaching a flexible cover part to a main body part to make the camera lighttight, comprising the steps of:

a) closing the cover part partially relative to the main body part and bowing the cover part inwardly to hold fast a film section between the two parts; and b) closing the cover part fully to said main body part and straightening the cover part to release the film section.

* * * * *

UNITED STATES PATENT AND TRADEMARK OFFICE
CERTIFICATE OF CORRECTION

PATENT NO. : 5,581,321
DATED : December 3, 1996
INVENTOR(S) : James D. Boyd

It is certified that error appears in the above-indentified patent and that said Letters Patent is hereby corrected as shown below:

Title Page, Item [56]   Please delete under Item [56] References Cited, FOREIGN PATENT DOCUMENTS "2257801 1/1993 Japan" and replace with --2257801 1/1993 Great Britain--.

Signed and Sealed this

Twenty-first Day of July, 1998

Attest:

BRUCE LEHMAN

Attesting Officer            Commissioner of Patents and Trademarks